United States Patent [19]

Young

[11] Patent Number: 5,252,308
[45] Date of Patent: Oct. 12, 1993

[54] TRANSPORTING UREA FOR QUANTITATIVE CONVERSION INTO AMMONIA

[75] Inventor: Donald C. Young, Fullerton, Calif.

[73] Assignee: Union Oil Company of California, Los Angeles, Calif.

[21] Appl. No.: 816,406

[22] Filed: Dec. 31, 1991

[51] Int. Cl.$^5$ .............................................. C01C 1/08
[52] U.S. Cl. .................................... 423/358; 423/235
[58] Field of Search .......................... 423/358; 564/73

[56] References Cited

U.S. PATENT DOCUMENTS 4,220,635 9/1980 Schell .................................... 423/358

FOREIGN PATENT DOCUMENTS 896660 5/1962 United Kingdom ................ 423/308

OTHER PUBLICATIONS

Kirk-Othmer, *Encyclopedia of Chemical Technology*, Third Edition, vol. 23, John Wiley & Sons (1983), p. 562.

*Primary Examiner*—Wayne Langel
*Attorney, Agent, or Firm*—Gregory F. Wirzbicki; Charles L. Hartman

[57] ABSTRACT

High purity ammonia is quantitatively produced from urea by reaction with water in the presence of acid. A major advantage of the invention is that urea can be safely transported to a conversion site, then converted to ammonia. The net result is that high purity ammonia is available wherever it is needed without the toxic hazard presented by transporting ammonia.

28 Claims, 1 Drawing Sheet

TRANSPORTING UREA FOR QUANTITATIVE CONVERSION INTO AMMONIA

FIELD OF THE INVENTION

This invention relates to methods of use of urea. Particularly, this invention relates to the shipment, storage, and conversion of urea into ammonia. More specifically, this invention relates to transporting urea and subsequently quantitatively converting the urea into ammonia.

STATE OF THE ART

Anhydrous ammonia is used in massive quantities world-wide for many industrial and agricultural purposes. A gas at ambient temperatures and pressures, it is normally shipped and stored as a liquid, either in pressure vessels at ambient temperature, e.g., at about 20° C. and 100 psig, or in refrigerated vessels at ambient or nearly ambient pressure, e.g., at about −33° C. and 0.5 psig. It is transported in bulk in ships, barges, and railroad tank cars, and in tank trucks on public roads and highways. It is frequently stored in large quantities at industrial sites in populated areas and is frequently used as the working fluid in large refrigeration systems. It is now coming into wider use for the removal of NOx from flue gas at power generating stations in urban areas.

Anhydrous ammonia is an extremely hazardous, toxic, and volatile material. In the event of an accidental discharge, it can cause immediate death to humans and animals and rapid death to trees and plants.

Both anhydrous liquid ammonia and very concentrated aqueous liquid ammonia display a deadly characteristic which substantially increases the risk of widespread injury and death in case of a spill. Specifically, upon sudden release to the atmosphere, as might occur in a train wreck or a traffic accident, the ammonia forms a cloud produce up of an aerosol fog of liquid ammonia droplets. Unlike gaseous ammonia, which, though toxic, is lighter than air and quickly dissipates to harmless concentrations, the cloud can persist for a surprisingly long time, as long as several hours, before it finally disappears. The cloud is typically heavier than air and tends to drift along the surface of the earth, i.e., the ground or the surface of a body of water. The cloud moves with the wind and can sweep over a total area, i.e., a "footprint," much larger than the area covered by the cloud at any one moment. Contact with the cloud is instantly incapacitating, and a single breath can be fatal.

Substantial numbers of bulk shipments of anhydrous ammonia routinely move through or near densely populated areas. It is estimated that an anhydrous ammonia spill from a 40,000 pound truck trailer would generate a cloud having an average lethal footprint of 29 acres, that is, an area of 29 acres in which the concentration of ammonia would reach a lethal level, about 0.5 percent, before the cloud eventually dissipated.

It is apparent that if another, less hazardous commodity could be transported instead of ammonia and then be readily converted back to ammonia the hazards associated with ammonia shipment would be considerably reduced. Urea is an ideal candidate ammonia substitute. It is solid, so the possibility of a cloud forming is negligible. Furthermore, it is essentially non-toxic. But, unfortunately, one cannot quantitatively convert urea into highly pure ammonia using conventional technology. One conventional process for converting urea into ammonia is by contacting the urea with strong base, for example sodium hydroxide. However, the yield is poor, and one is faced with a problem of how to dispose of the carbonate produced from the decomposition of urea. A second conventional practice is to pyrolyze urea. But this process is not quantitative and produces a plurality of products, including biuret, triuret, cyanuric acid, and ammelide. Such a method is clearly unsuitable if the final use of the ammonia requires pure ammonia.

SUMMARY OF THE INVENTION

This invention provides a method for quantitatively converting urea to ammonia. The ammonia produced is of high purity. Generally, the ammonia is produced by the sequence of reactions shown in Rxn. 1 and Rxn. 2.

$$(NH_2)_2CO + 2HAn + H_2O \rightarrow 2NH_4An + CO_2 \quad \text{(Rxn. 1)}$$

$$2NH_4An \rightarrow NH_3 + 2HAn \quad \text{(Rxn. 2)}$$

where An. is an anion.

An aspect of this invention is a method for producing ammonia at a location of use remote from a manufacturing source of ammonia comprising transporting bulk urea to the location; and converting said urea quantitatively into ammonia at the location.

A preferred embodiment of the present invention is a method for producing ammonia at a location of use remote from a manufacturing source of ammonia comprising, manufacturing urea in bulk; transporting the urea manufactured to a location where ammonia is needed; converting the urea into ammonia by reaction with water in the presence of an acid at a temperature greater than 45° C.; and recovering the ammonia produced.

An alternative preferred embodiment is a method for supplying ammonia at a location of use remote from a source of ammonia comprising manufacturing urea in bulk; transporting the urea manufactured to a location where ammonia is needed; reacting the urea with water in the presence of an acid at a temperature greater than 45° C. to form a heat labile ammonium salt and substantially pure carbon dioxide; heating the heat labile ammonium salt to form ammonia; and recovering the anhydrous ammonia produced from the decomposition of the ammonium salt.

Another alternative embodiment of this invention is a method of contacting flue gases with a mixture of ammonia and carbon dioxide to control the emission of oxides of nitrogen. Urea is reacted with water in the presence of an acid at a temperature greater than 145° C. in a reaction vessel. Ammonia and carbon dioxide are produced in the reaction vessel and allowed to contact a gas stream containing oxides of nitrogen at a temperature in the range of 1300° F. to 2000° F. Oxides of nitrogen are removed from the gas stream.

DETAILED DESCRIPTION OF THE INVENTION

Figure 1:
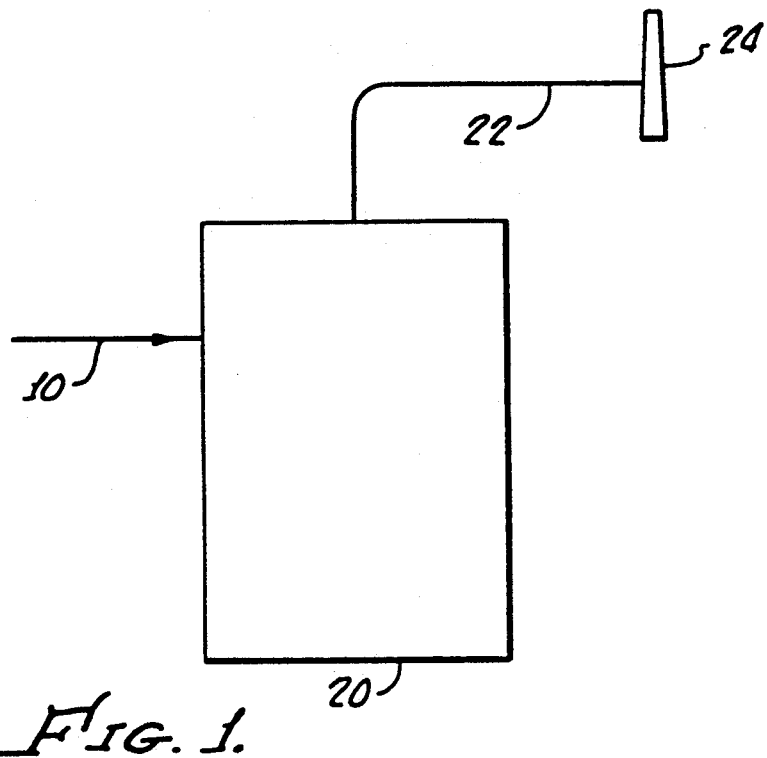
FIG. 1 shows a schematic drawing for a preferred embodiment of the present invention using one reaction vessel.

Urea and urea decomposition products can be quantitatively converted into ammonia. Urea decomposition products, hereinafter included when urea is referred to, include biuret, triuret, similar higher polymers, cyanuric acid and ammelide. Urea or urea decomposition products are produced at a nitrogen plant instead of ammonia. Urea produced need not be scrupulously free of urea decomposition products. The urea is then transported to a conversion site where ammonia is produced.

Urea is a substantially non-toxic chemical compound. It is solid under ambient temperatures and pressures. Consequently, urea can be safely shipped in bulk and stored for long periods of time until it is converted into ammonia.

In the process of this invention urea is manufactured in bulk, used herein to refer to quantities larger than about 100 pounds. The urea is then transported at least 10 miles, usually more than 100 miles, for example, by truck over highways, by rail, by bulk load on offshore shipping, or bulk load on inshore barge traffic to a site where ammonia is desired. The urea is then quantitatively converted into ammonia at the site of use.

A molecule of urea can be decomposed into two molecules of ammonia and a molecule of carbon dioxide by the addition of one molecule of water. Normally this reaction does not proceed quantitatively. However, it has been discovered in this invention that the addition of water to urea can be done quantitatively in a concentrated aqueous acid solution. Preferred acids include protic acids, especially protic mineral acids, for example hydrochloric acid and the like. Particularly preferred acids are polyprotic mineral acids, for example, phosphoric acid and sulfuric acid.

Urea can be decomposed by one of two preferred embodiments. The selection of the appropriate embodiment for a given use is dependent upon whether the final use can tolerate carbon dioxide as a contaminant of the ammonia produced or whether the final use of ammonia requires pure ammonia. The first embodiment is a single step process and the second embodiment is a two-step process. Whichever process is chosen for the particular application, the same two reactions occur:

$$(NH_2)_2CO + 2HAn + H_2O \rightarrow 2NH_4An + CO_2 \quad \text{(Rxn. 1)}$$

$$2NH_4An \rightarrow 2NH_3 + 2HAn \quad \text{(Rxn. 2)}$$

where An. is an anion.

Rxn. 1 occurs at reasonable rates when the temperature is maintained at higher than about 45° C. and is exothermic. It should be noticed that water is a reactant, not just a solvent. The reaction will normally be done in an excess of acid. It is preferred that the temperature be elevated to more than 45° C., but whatever the operating temperature, the reaction vessel must be cooled to maintain that temperature and prevent run away reaction conditions.

Rxn. 2 occurs at reasonable rates at higher temperatures, greater than about 130° C., and preferably at greater than 150° C., preferably in the range of 150°–200° C. This reaction is endothermic and must have external heat applied to maintain the required temperature.

An. as used in Rxn. 1 and Rxn. 2 can be any anion. Preferred anions are deprotonated acids, for example chloride and nitrate. Particularly preferred anions are singly deprotonated polyprotic acids, for example bisulfide, bicarbonate, and dihydrogenphosphate. Dihydrogenphosphate is the most particularly preferred anion for this invention. Then the preferred acid used is concentrated aqueous phosphoric acid. The reaction sequence for that case is:

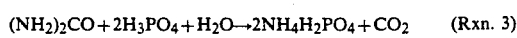

$$(NH_2)_2CO + 2H_3PO_4 + H_2O \rightarrow 2NH_4H_2PO_4 + CO_2 \quad \text{(Rxn. 3)}$$

$$2NH_4H_2PO_4 \rightarrow NH_3 + 2H_3PO_4 \quad \text{(Rxn. 4)}$$

In the preferred reaction sequence concentrated aqueous phosphoric acid, in Rxn. 3, is heated between 50° C. and 60° C. The reaction is done in a great excess of phosphoric acid. Preferably, water is added as a reagent and is replenished as the reaction proceeds. Preferably, water is added in equimolar amounts as urea is added to the reaction vessel.

In Rxn. 4 the temperature is maintained at about 145°–210° C. Ammonia is produced from this reaction and is removed for use. The ammonia may be removed under Pressure since the reaction is done at high temperature. preferably, the phosphoric acid produced in this step is recycled to the first reaction vessel for reuse.

Rxn. 3 can be driven substantially to completion at a much lower temperature than is required for Rxn. 4. One result of this difference in dependence on temperature is that Rxn. 3 can be done either independently of Rxn. 4 or it can be done simultaneously with Rxn. 4. If Rxn. 3 is done independently from Rxn. 4, then the gas produced in Rxn. 3, carbon dioxide, can be recovered in substantially pure form, and the gas produced in Rxn. 4, ammonia can be recovered in substantially pure form. Otherwise, a mixture of gases is recovered.

Rxn. 3 and Rxn. 4 can proceed simultaneously in one reaction vessel or the two reactions can be segregated into two reaction vessels. Each approach has its distinct advantages for different operating environments. The one step embodiment provides a gaseous product that is a combination of carbon dioxide and ammonia gas, while the two step process provides a first product stream of substantially pure carbon dioxide and a separate product stream of substantially pure ammonia.

Rxn. 3 is endothermic and Rxn. 4 is exothermic. Therefore with careful thermal insulation and heat exchange either the one vessel approach or the two vessel approach can proceed using only modest energy input. In the one step process the reactants are heated to a temperature sufficient to sustain both reactions simultaneously. In the two step process the two vessels which are thermally connected by means of a heat exchanger. The net heat input into the one or two step process is therefore minimal. Each reaction vessel can be thermally insulated from the environment, further allowing efficient use of energy input into the system.

The two embodiments are more fully explained by reference to the Figures. Referring to FIG. 1 a mixture of urea and water in line 10 is introduced into a reaction vessel 20 containing concentrated liquid phosphoric acid. The reaction vessel 20 is maintained at a temperature greater than 150° C. Rxn. 3 and Rxn. 4 proceed simultaneously in the reaction vessel liberating carbon dioxide gas and ammonia. The gases produced are removed as a mixture in line 22. The mixture of gases in line 22 constitute a source of ammonia and can be used for any purpose ammonia can be used for. For example, the ammonia containing gases can be introduced into a gas flue 24 containing exhaust emissions including substantial amounts of carbon dioxide, as well as lesser amounts of amounts of oxides of nitrogen. The gases containing oxides of nitrogen react with the ammonia to remove nitrogen oxide gases from the gas stream. Although the flue is a preferred embodiment, the single step method can be used to produce ammonia for other uses where the presence of carbon dioxide is not harmful.

Figure 2:
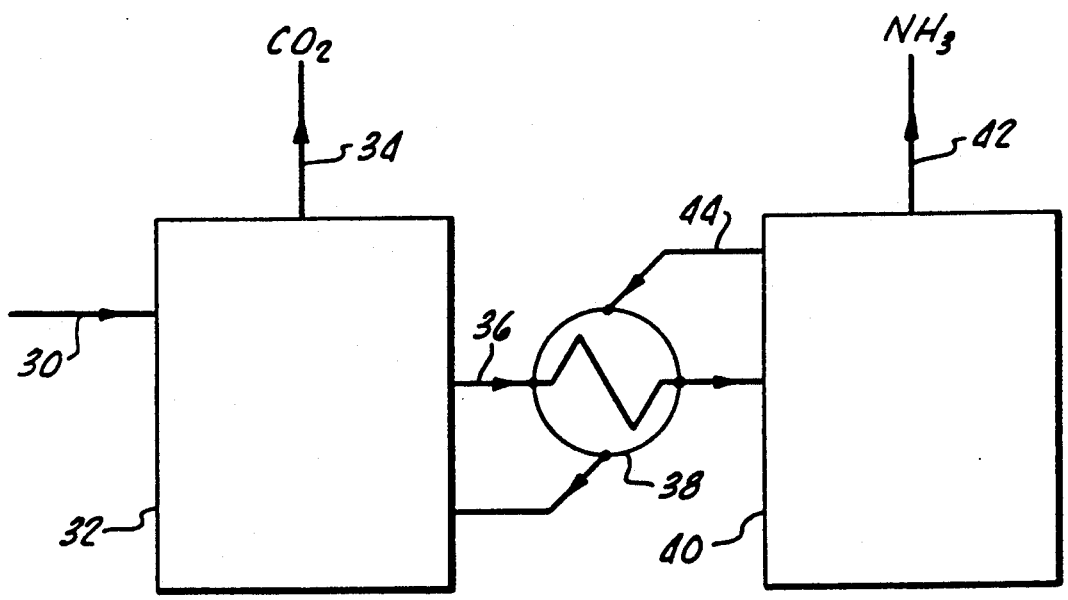
FIG. 2 shows a schematic drawing for an embodiment of the present invention using two reaction vessels.

In the second embodiment, depicted in FIG. 2, a mixture of water and urea in line 30 is introduced into a first reaction vessel 32 containing concentrated liquid phosphoric acid maintained at a temperature of about 50° C. A gaseous product stream of carbon dioxide is removed from the vessel though line 34. Although not shown in the drawing, the substantially pure carbon dioxide produced from the first reaction vessel can be recovered and pressurized for use. A monoammonium dihydrogen phosphate effluent stream is removed in line 36 and travels through a heat exchanger 38 to warm the monoammonium dihydrogen phosphate. The monoammonium dihydrogenphos-phate enters a second reaction vessel 40 maintained at a temperature of about 150° C. A gaseous stream of substantially pure anhydrous ammonia is removed in line 42 from the second vessel. As in the case with the recovered carbon dioxide stream, the substantially pure ammonia stream recovered can be pressurized for convenient use. A second effluent stream containing phosphoric acid for recycle is removed in line 44 and travels through the heat exchanger to be cooled before being admitted to the first reaction vessel 32.

The second embodiment allows the production of separate streams of substantially pure carbon dioxide and substantially pure ammonia for use in applications where impurities in either gas would be detrimental to the intended use. Examples of such uses include the use of ammonia as a refrigerant and the use of carbon dioxide as a food additive.

It will of course be appreciated that the liquids being recycled in lines 36 and 44 are not pure but instead comprise a mixture of phosphoric acid, monoammonium dihydrogen phosphate, water, and perhaps impurities. The recycle rate of the liquid in the two reaction vessels is chosen based on the percentage conversion desired and the temperature at which the reaction vessels are maintained. Usually the temperature of the second reaction vessel is high enough to provide substantially complete conversion of monoammonium dihydrogenphosphate into ammonia and phosphoric acid. The time required for such conversion is related to the temperature of the second reaction vessel. The recycle rate is then dictated by the time required for the conversion reaction. Therefore, higher temperatures will normally require higher recycle rates.

Reaction vessel 10 and second reaction vessel 40 must be produced of a material that can withstand hot, concentrated phosphoric acid. The preferred materials to hold phosphoric acid at about 50° C. include Hastalloy and graphite. The material chosen is based on the temperature to be maintained in the reaction vessel and the recycle rate of the phosphoric acid. Cooler reaction vessel temperatures and more rapid phosphoric acid recycle rates generally require less corrosion resistant vessels. The material the cooler first reaction vessel 32 is made from can be less corrosion resistant than the second reaction vessel, and can be stainless steel or carbon steel.

The physical size of the conversion site can be small. Portable conversion units are one preferred embodiment. Then ammonia can be produced directly at the site of use, even if the site is remote and the amount of ammonia required is small. An added advantage to smaller conversion units is that the amount of expensive material required for reaction vessel 20 or the second reaction vessel 40 is greatly reduced compared to the material requirements of a large stationary site.

Although this invention has been primarily described in conjunction with references to the preferred embodiments thereof, it is evident that many alternatives, modifications and variations are apparent to those skilled in the art in light of the foregoing description. Accordingly, it is intended that the spirit and scope of the appended claims embrace all such alternatives, modifications and variations.

What is claimed is:

1. A method for producing ammonia at a location of use otherwise remote from a source of ammonia comprising:
   transporting bulk urea to the location;
   contacting the urea with water and a polyprotic acid at elevated temperature to produce gaseous ammonia; and
   recovering the gaseous ammonia produced from the urea at the location.

2. The method of claim 1 wherein the polyprotic acid comprises phosphoric acid.

3. The method of claim 1 wherein the polyprotic acid comprises sulfuric acid.

4. The method of claim 1 wherein the contacting step further comprises contacting the urea with concentrated aqueous phosphoric acid at a temperature greater than 45° C.

5. The method of claim 4 wherein the contacting temperature is greater than 145° C.

6. The method of claim 1 wherein the contacting step further comprises sequentially
   (a) contacting, in a first reaction zone, the urea with concentrated phosphoric acid at a temperature of at least 45° C. to produce monoammonium dihydrogen phosphate and carbon dioxide, and
   (b) heating the monoammonium dihydrogen phosphate, in a second reaction zone, to greater than 145° C. to produce ammonia and phosphoric acid.

7. The method of claim 1 wherein the contacting step further comprises contacting urea with concentrated aqueous phosphoric acid at greater than 145° C. and forcing the carbon dioxide to exit the first reaction zone and ammonia produced to exit the second reaction zone through a flue containing oxides of nitrogen.

8. The method of claim 1 wherein the ammonia recovered is substantially pure anhydrous ammonia.

9. A method for producing ammonia at a location of use otherwise remote from a source of ammonia comprising:
   (a) manufacturing urea in bulk;
   (b) transporting the urea manufactured to a location where ammonia is needed;
   (c) converting the urea into ammonia by reaction with water in the presence of an acid at a temperature greater than 45° C.; and
   (d) recovering the gaseous ammonia produced.

10. The method of claim 9 wherein step (c) further comprises substantial quantitative conversion of urea into ammonia.

11. The method of claim 9 wherein the method further comprises step (e) after step (d) comprising forcing the carbon dioxide and ammonia produced to exit into a flue carrying gases containing oxides of nitrogen.

12. The method of claim 9 wherein the acid comprises a polyprotic acid.

13. The method of claim 12 wherein the polyprotic acid comprises phosphoric acid.

14. The method of claim 13 wherein the contacting step comprises contacting the urea with concentrated aqueous phosphoric acid at a temperature greater than 145° C.

15. A method for supplying ammonia at a location of use remote otherwise from a source of ammonia comprising:
   (a) manufacturing urea in bulk;
   (b) transporting the urea manufactured to a location where ammonia is needed;
   (c) reacting, in a first reaction zone, the transported urea with water in the presence of an acid at a temperature greater than 45° C. to form a heat labile ammonium salt and substantially pure carbon dioxide;
   (d) heating, in a second reaction zone, the heat labile ammonium salt to form gaseous ammonia; and
   (e) recovering the gaseous anhydrous ammonia produced from the decomposition of the ammonium salt.

16. The method of claim 15 wherein step (c) further comprises recovering the substantially pure carbon dioxide produced.

17. The method of claim 15 wherein step (c) further comprises reacting urea with water in the presence of phosphoric acid at between 45° C. and 100° C. and recovering the substantially pure carbon dioxide produced.

18. The method of claim 15 wherein the acid is a polyprotic acid.

19. The method of claim 18 wherein the polyprotic acid is phosphoric acid.

20. The method of claim 15 further comprising the steps of recovering phosphoric acid produced in step (e); and exchanging heat from the recovered phosphoric acid to heat the monoammonium dihydrogenphosphate.

21. A method for producing ammonia comprising
   (a) transporting bulk urea by truck or rail from a first location to a second location;
   (b) substantially quantitatively converting the urea to ammonia at the second location by contacting the urea with concentrated aqueous phosphoric acid at a temperature greater than 45° C.

22. The method of claim 21 wherein the contacting temperature is greater than 145° C.

23. The method of claim 21 wherein the converting step further comprises sequentially
   (a) contacting, in a first reaction zone, the urea with concentrated phosphoric acid at a temperature of at least 45° C. to produce monoammonium dihydrogen phosphate and carbon dioxide, and
   (b) heating the monoammonium dihydrogen phosphate, in a second reaction zone, to greater than 145° C. to produce ammonia and phosphoric acid.

24. The method of claim 23 wherein the converting step further comprises contacting urea with concentrated aqueous phosphoric acid at greater than 145° C. and forcing the carbon dioxide produced in the first reaction zone and ammonia produced in the second reaction zone through a flue containing oxides of nitrogen.

25. A method for producing ammonia comprising
   (a) transporting bulk urea by offshore shipping or inshore barge traffic from a first location to a second location;
   (b) substantially quantitatively converting the urea to ammonia at the second location by contacting the urea with concentrated aqueous phosphoric acid at a temperature greater than 45° C.

26. The method of claim 25 wherein the contacting temperature is greater than 145° C.

27. The method of claim 25 wherein the converting step further comprises sequentially
   (a) contacting, in a first reaction zone, the urea with concentrated phosphoric acid at a temperature of at least 45° C. to produce monoammonium dihydrogen phosphate and carbon dioxide, and
   (b) heating the monoammonium dihydrogen phosphate, in a second reaction zone, to greater than 145° C. to produce ammonia and phosphoric acid.

28. The method of claim 27 wherein the converting step further comprises contacting urea with concentrated aqueous phosphoric acid at greater than 145° C. and forcing the carbon dioxide produced in the first reaction zone and ammonia produced int he second reaction zone exit through a flue containing oxides of nitrogen.

* * * * *

UNITED STATES PATENT AND TRADEMARK OFFICE
CERTIFICATE OF CORRECTION

PATENT NO. : 5,252,308

DATED : October 12, 1993

INVENTOR(S) : Donald C. Young

It is certified that error appears in the above-identified patent and that said Letters Patent is hereby corrected as shown below:

Claim 28, column 8, line 46, replace "int he" with -- in the --.

Signed and Sealed this

Nineteenth Day of April, 1994

Attest:

BRUCE LEHMAN

*Attesting Officer*  *Commissioner of Patents and Trademarks*